United States Patent
Asoma

(10) Patent No.: US 8,023,004 B2
(45) Date of Patent: Sep. 20, 2011

(54) IMAGING APPARATUS, IMAGING METHOD, AND PROGRAM FOR SELECTIVELY CONTROLLING GAIN IN A NORMAL IMAGING MODE AND A COMBINED IMAGING MODE

(75) Inventor: Akira Asoma, Kanagawa (JP)

(73) Assignee: Sony Corporation, Tokyo (JP)

( * ) Notice: Subject to any disclaimer, the term of this patent is extended or adjusted under 35 U.S.C. 154(b) by 454 days.

(21) Appl. No.: 12/188,580

(22) Filed: Aug. 8, 2008

(65) Prior Publication Data

US 2009/0086056 A1   Apr. 2, 2009

(30) Foreign Application Priority Data

Sep. 28, 2007   (JP) ................. 2007-255207

(51) Int. Cl.
*H04N 5/235* (2006.01)
*H04N 5/232* (2006.01)
*H04N 5/335* (2006.01)

(52) U.S. Cl. ............... 348/229.1; 348/221.1; 348/230.1; 348/296; 348/297

(58) Field of Classification Search ............... 348/229.1, 348/362, 218.1, 216.1, 221.1, 230.1, 251, 348/296–299, 363, 364
See application file for complete search history.

(56) References Cited

U.S. PATENT DOCUMENTS

| | | | |
|---|---|---|---|
| 5,455,621 A | | 10/1995 | Morimura |
| 5,831,676 A | * | 11/1998 | Takahashi et al. ............ 348/362 |
| 6,587,149 B1 | * | 7/2003 | Yoneyama et al. ........... 348/362 |
| 6,670,993 B1 | * | 12/2003 | Yamamoto et al. ........... 348/362 |
| 7,609,320 B2 | * | 10/2009 | Okamura ...................... 348/362 |
| 2002/0012065 A1 | * | 1/2002 | Watanabe ..................... 348/364 |
| 2006/0033823 A1 | | 2/2006 | Okamura |
| 2006/0250515 A1 | * | 11/2006 | Koseki et al. ................. 348/362 |
| 2008/0231728 A1 | * | 9/2008 | Asoma ....................... 348/229.1 |
| 2008/0266424 A1 | * | 10/2008 | Asoma ......................... 348/234 |

(Continued)

FOREIGN PATENT DOCUMENTS

JP   6-141229   5/1994

(Continued)

OTHER PUBLICATIONS

U.S. Appl. No. 12/015,815, filed Jan. 17, 2008, Asoma.

(Continued)

*Primary Examiner* — Lin Ye
*Assistant Examiner* — Marly Camargo
(74) *Attorney, Agent, or Firm* — Oblon, Spivak, McClelland, Maier & Neustadt, L.L.P.

(57) ABSTRACT

An imaging apparatus includes an imaging unit capable of selectively executing an imaging operation in a normal imaging mode that outputs a normal exposure image signal in a unit period and an imaging operation in a combined imaging mode that outputs a long-time-exposure image signal and a short-time-exposure image signal, a pre-processing unit that performs gain processing on the normal exposure image signal, or the signals, a signal processing unit that, by combining the image signals, generates a combined image signal, and a control unit that performs control in which, by switching a reference gain setting value in the gain processing in the pre-processing unit in accordance with the normal or combined imaging mode, when the imaging unit is in the combined imaging mode, the reference gain setting value is set to be greater than the reference gain setting value when the imaging unit is in the normal imaging mode.

4 Claims, 6 Drawing Sheets

U.S. PATENT DOCUMENTS

| | | | |
|---|---|---|---|
| 2008/0284872 A1* | 11/2008 | Asoma | 348/229.1 |
| 2009/0086061 A1* | 4/2009 | Asoma | 348/241 |
| 2009/0086085 A1* | 4/2009 | Asoma | 348/362 |
| 2009/0295941 A1* | 12/2009 | Nakajima et al. | 348/229.1 |

FOREIGN PATENT DOCUMENTS

| | | |
|---|---|---|
| JP | 7-240859 | 9/1995 |
| JP | 11-155108 | 6/1999 |
| JP | 2001-197362 | 7/2001 |
| JP | 2002-84449 | 3/2002 |
| JP | 2004-120205 | 4/2004 |
| JP | 2007-208642 | 8/2007 |
| JP | 2007-228297 | 9/2007 |

OTHER PUBLICATIONS

U.S. Appl. No. 12/190,800, filed Aug. 13, 2008, Asoma.
U.S. Appl. No. 12/195,493, filed Aug. 21, 2008, Asoma.
U.S. Appl. No. 12/509,741, filed Jul. 27, 2009, Asoma.

* cited by examiner

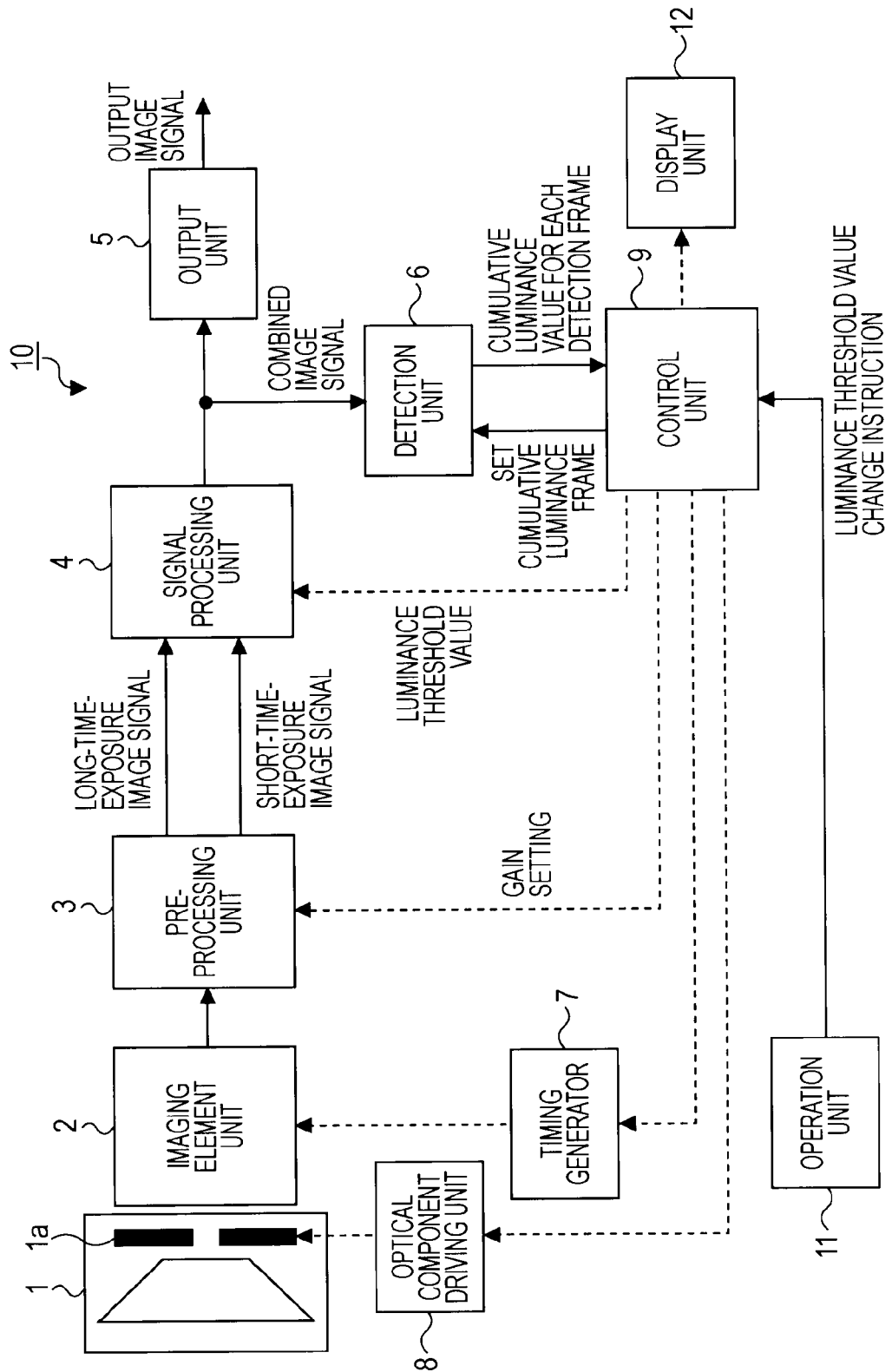

IMAGING APPARATUS, IMAGING METHOD, AND PROGRAM FOR SELECTIVELY CONTROLLING GAIN IN A NORMAL IMAGING MODE AND A COMBINED IMAGING MODE

CROSS REFERENCES TO RELATED APPLICATIONS

The present invention contains subject matter related to Japanese Patent Application JP 2007-255207 filed in the Japanese Patent Office on Sep. 28, 2007, the entire contents of which are incorporated herein by reference.

BACKGROUND OF THE INVENTION

1. Field of the Invention

The present invention relates to an imaging apparatus, an imaging method, and a program that can selectively execute an imaging operation in a normal imaging mode that outputs one exposure image signal in a unit period, and an imaging operation in a combined imaging mode that, in the unit period, outputs a long-time-exposure image signal corresponding to a relatively long exposure time and a short-time-exposure image signal corresponding to a relatively short exposure time.

2. Description of the Related Art

In an imaging apparatus of the related art in which a solid-state imaging device such as a charge-coupled device is used, the amount of light (exposure) input to the imaging device is adjusted by controlling an aperture and an electronic shutter speed. In other words, the amount of exposure is controlled. When imaging is performed on a bright scene, the amount of exposure is reduced so that overexposure is prevented from occurring due to saturation of an output signal of the imaging device. Conversely, for a dark scene, the amount of light is increased so that so-called underexposure is prevented from occurring.

In the case of performing imaging on a scene having a large difference in brightness, such as back-lit imaging and indoor-outdoor simultaneous imaging, insufficiency of a dynamic range of a solid-state imaging device may cause a problem in that only controlling the amount of exposure makes it difficult to appropriately reproduce bright portions and dark portions since the bright portions tend to be saturated and therefore overexposed and the dark portions tend to be underexposed.

To solve the problem, a method is disclosed in Japanese Unexamined Patent Application Publication No. 6-141229 and corresponding U.S. Pat. No. 5,455,621 in which, by using two different electronic shutter speeds in a field, or changing an electronic shutter speed in each field, imaging on bright area information and imaging on dark area information are separately performed, and the resultant information is processed into an image.

In addition, as an apparatus to which the above method is applied, there is an apparatus (wide dynamic range camera) that can perform imaging on an image having a wide dynamic range, and an apparatus and method that improve the quality of a combined image are disclosed in Japanese Unexamined Patent Application Publication Nos. 2002-84449 and 2004-120205 (corresponding United States Patent Application No. 2006-0033823A1).

In general, an operating state of a wide dynamic range camera is one of two types: a combined imaging mode in which wide dynamic range imaging is performed, and a normal imaging mode in which wide dynamic range imaging is not performed. In exposure control of a wide dynamic range camera of the related art, the combined imaging mode and the normal imaging mode have a common output amplitude (operation region) for an imaging device. As shown in FIG. 8, the operation region is set at a level lower than a saturation region of the imaging device. This is because, when the operation region of the imaging device extends to the saturation region, as shown in FIG. 9, saturation unevenness is generated due to a variation of a dynamic range for each pixel for a high luminance signal, and image quality in a high luminance portion deteriorates.

However, as described above, when the operation region is set at a level lower than the saturation region, the saturation unevenness is prevented from being generated. Nevertheless, a new problem occurs in that lowering of the operation region causes a deterioration in a signal-to-noise ratio.

In addition, it is expected that, in a normal operation mode, an operation region be extended. Accordingly, signal processing is necessary in which the saturation unevenness is reduced so as to be as small as possible.

An imaging apparatus is disclosed in Japanese Unexamined Patent Application Publication No. 7-240859 in which fixed form noise that is generated in a white portion due to a variation in a dynamic range for each pixel is prevented from being emphasized by aperture correction and which is configured to obtain a wide dynamic range.

By using this technology in signal processing in the normal imaging mode, the operation region can be extended and the signal-to-noise ratio can be increased.

Deterioration in the signal-to-noise ratio may be more problematic than the saturation unevenness depending on the purpose of a camera. In the normal operation mode, it may be expected that the operation region be extended, even if the above-described processing of reducing the saturation unevenness is not performed.

SUMMARY OF THE INVENTION

As described above, when the operation region is set at a level lower than the saturation region, the saturation unevenness can be prevented from being generated. However, a problem in that lowering of the operation region deteriorates the signal-to-noise ratio is important only in the normal imaging mode in a wide dynamic range camera. In the combined imaging mode, the problem does not matter since the main purpose of the combined imaging mode is to extend the dynamic range. In the combined imaging mode, combining of a signal including saturation unevenness causes image quality deterioration; this deterioration depends on the signal processing used for combining processing. Thus, it is necessary to set an operation region to be completely lower than the saturation region.

In view of the above-described circumstances of the related art, it is desirable to provide an imaging apparatus, an imaging method, and a program that, when an imaging operation in a normal imaging mode that outputs one exposure image signal, and an imaging operation in a combined imaging mode that outputs a long-time-exposure image signal corresponding to a relatively long time in a unit period and a short-time-exposure image signal corresponding to a relatively short exposure time are selectively executed, increases a signal-to-noise ratio in the normal imaging mode, and prevents saturation unevenness in the combined imaging mode.

According to an embodiment of the present invention, there is provided an imaging apparatus including: an imaging unit capable of selectively executing an imaging operation in a normal imaging mode that outputs a normal exposure image signal as one exposure image signal in a unit period and an imaging operation in a combined imaging mode that outputs, in the unit period, a long-time-exposure image signal corresponding to a relatively long exposure time and a short-time-exposure image signal corresponding to a relatively short exposure time; a pre-processing unit that performs gain processing on the normal exposure image signal, or the long-time-exposure image signal and the short-time-exposure image signal; a signal processing unit that, by combining the long-time-exposure image signal and short-time-exposure image signal subjected to the gain processing, generates a combined image signal having a dynamic range relatively wider than at least one of dynamic ranges of the long-time-exposure image signal and the short-time-exposure image signal; and a control unit that performs control in which, by switching a reference gain setting value in the gain processing in the pre-processing unit in accordance with one of the normal imaging mode and the combined imaging mode, when the imaging unit is in the combined imaging mode, the reference gain setting value is set to be greater than the reference gain setting value set when the imaging unit is in the normal imaging mode.

According to another embodiment of the present invention, there is provided an imaging method including the steps of: performing imaging in one of an imaging operation in a normal imaging mode that outputs a normal exposure image signal as one exposure image signal in a unit period, and an imaging operation in a combined imaging mode that outputs, in the unit period, a long-time-exposure image signal corresponding to a relatively long exposure time and a short-time-exposure image signal corresponding to a relatively short exposure time; performing gain processing on the normal exposure image signal, or the long-time-exposure image signal and the short-time-exposure image signal; by combining the long-time-exposure image signal and short-time-exposure image signal subjected to the gain processing, generating a combined image signal having a dynamic range relatively wider than at least one of dynamic ranges of the long-time-exposure image signal and the short-time-exposure image signal; and by switching a reference gain setting value in the gain processing in accordance with one of the normal imaging mode and the combined imaging mode, in the case of the combined imaging mode, setting the reference gain setting value to be greater than the reference gain setting value in the normal imaging mode.

According to another embodiment of the present invention, there is provided a program for causing a computer to execute an imaging method including the steps of: performing imaging in one of an imaging operation in a normal imaging mode that outputs a normal exposure image signal as one exposure image signal in a unit period, and an imaging operation in a combined imaging mode that outputs, in the unit period, a long-time-exposure image signal corresponding to a relatively long exposure time and a short-time-exposure image signal corresponding to a relatively short exposure time; performing gain processing on the normal exposure image signal, or the long-time-exposure image signal and the short-time-exposure image signal; by combining the long-time-exposure image signal and short-time-exposure image signal subjected to the gain processing, generating a combined image signal having a dynamic range relatively wider than at least one of dynamic ranges of the long-time-exposure image signal and the short-time-exposure image signal; and by switching a reference gain setting value in the gain processing in accordance with one of the normal imaging mode and the combined imaging mode, in the case of the combined imaging mode, setting the reference gain setting value to be greater than the reference gain setting value in the case of the normal imaging mode.

BRIEF DESCRIPTION OF THE DRAWINGS

FIG. 1 is a block diagram showing the configuration of an imaging apparatus to which the present invention is applied;

DESCRIPTION OF THE PREFERRED EMBODIMENTS

Figure 2A:
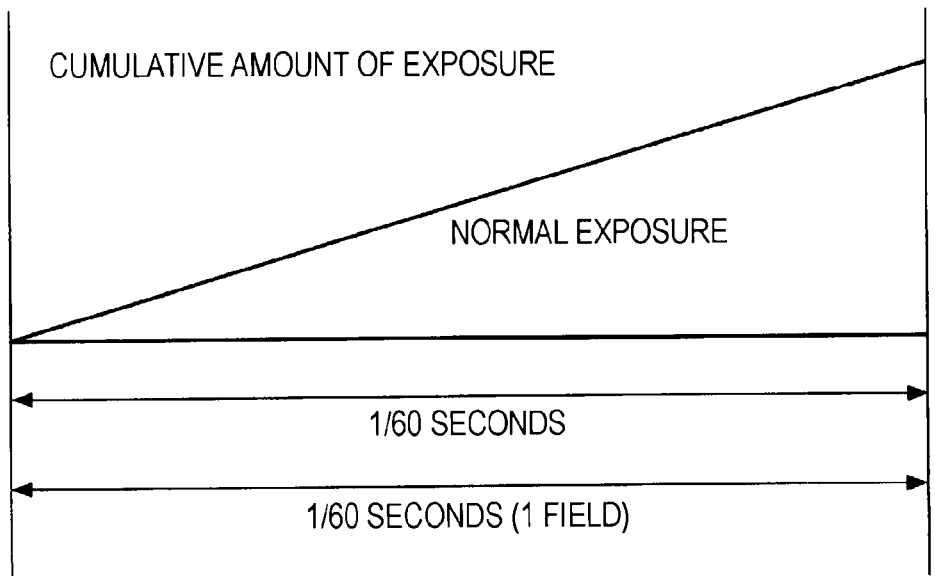
FIGS. 2A and 2B are graphs illustrating long time exposure and short time exposure in the imaging apparatus.

An embodiment of the present invention will be described in detail with reference to the accompanying drawings. The present invention is not limited to the following example. Needless to say, the present invention may be freely altered without departing the spirit thereof.

The present invention is applied to an imaging apparatus 10 having the configuration shown in, for example, FIG. 1.

Here, the imaging apparatus 10 is an imaging apparatus capable of an imaging operation in a combined imaging mode for a wide-dynamic-range camera, and is suitably used as, for example, a monitoring camera. Obviously, the imaging apparatus 10 can be used as a digital still camera, a digital video camera, or the like, used by an ordinary user.

The imaging apparatus 10 includes an imaging optical system 1, an imaging element unit 2, a pre-processing unit 3, a signal processing unit 4, an output unit 5, a detection unit 6, a timing generator 7, an optical component driving unit 8, a control unit 9, an operation unit 11, and a display unit 12.

The imaging optical system 1 includes a lens and an optical filter that eliminates unnecessary wavelengths, and an aperture 1a. Light incident from an object is guided to the imaging element unit 2 via optical components in the imaging optical system 1.

The imaging element unit 2 is configured as a solid-state image unit such as a charge-coupled device (CCD) a sensor array, or a complementary metal-oxide semiconductor (CMOS) sensor array. The imaging element unit 2 photoelectrically converts the light guided via the imaging optical system 1 and outputs an electric signal as a captured image. In the imaging apparatus 10, the imaging element unit 2 performs different exposure processes in a normal imaging mode and a combined imaging mode.

Figure 2B:
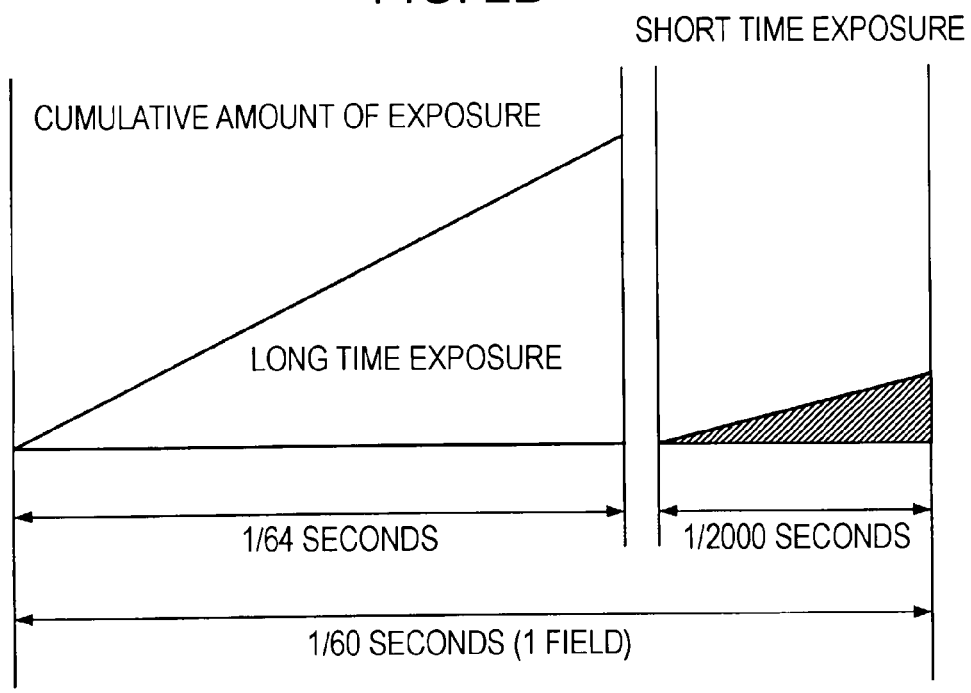

In other words, as shown in FIG. 2A, in the normal imaging mode, the imaging element unit 2 performs normal exposure that is exposure for a predetermined time in one field period, and outputs an electric signal as an exposure image signal. In the combined imaging mode, as shown in FIG. 2B, the imaging element unit 2 performs long time exposure and short time exposure in one field period, and time-divisionally outputs electric signals as a long-time-exposure image signal and a short-time-exposure image signal.

In the following description, for brevity of description, the exposure operation in the normal imaging mode as shown in FIG. 2A is called "normal exposure". Accordingly, the exposure operation in the normal imaging mode is distinguished from the "long time exposure" and "short time exposure" in the combined imaging mode as shown in FIG. 2B. In addition, the exposure image signal obtained by the normal exposure is called a "normal exposure image signal, and is distinguished from the "long-time-exposure image signal" and the "short-time-exposure image signal.

The imaging element unit 2 is not limited to a configuration in which a solid-state imaging device is used. For example, a configuration may be employed in which, for example, a non-solid-state imaging device such as an image pickup tube is used. Regarding the non-solid-state imaging device, by using a mechanical shutter, a liquid crystal shutter, or the like, long time exposure or short time exposure can be performed, and an exposure time of each of the normal exposure, the long time exposure, and the short time exposure can be changed.

Here, the normal imaging mode and the combined imaging mode will be mentioned below.

In a normal imaging operation (normal imaging mode) in a commonly used imaging apparatus, it is difficult to handle a wide dynamic range from a very dark portion of the object to a very bright portion of the object. For example, in a case where imaging is performed in an indoor place in a daytime zone on a fine day in a state in which an outdoor place can be seen, when an exposure reference is set on the basis of an object in the outdoor place, the outdoor portion loses gradation and an overexposed highlight is generated. Conversely, when the exposure reference is set on the basis of an outdoor portion, an indoor object has an underexposure state. In other words, in a case where there is a large difference in luminance in the object, it is difficult to obtain a captured image that matches the dynamic range of the luminance.

Unlike that, in the imaging operation in the combined imaging mode, by using, for example, an electronic shutter to change a shutter speed, and performing processing that combines a plurality of images having different exposure times, a captured image that has a wide dynamic range and that is free of an overexposed highlight and an underexposure state can be obtained.

However, the image obtain in the combined imaging mode may cause slight unnaturalness to the eye. Accordingly, depending on a user's preference, an imaging purpose, etc., it is preferable to switch between the normal imaging mode and the combined imaging mode in the case of performing imaging.

Each of FIGS. 2A and 2B shows an exposure time in one field and a cumulative amount of exposure (charge) in the imaging element unit 2.

FIG. 2A shows the case of the normal imaging mode, in which exposure is performed in one field period that is 1/60 seconds as a unit period of imaging. Although, in FIG. 2A, the exposure time is 1/60 seconds, needless to say, the exposure time is not limited to 1/60 seconds. A certain exposure time is set as an electronic shutter speed. In the imaging element unit 2, exposure is performed for a certain exposure time in one field period, and an exposure image signal for one field is obtained. Signal processing is performed on the exposure image signal to generate captured image data for one field.

FIG. 2B shows the case of the combined imaging mode. FIG. 2B shows that, in one field having 1/60 seconds, long time exposure having 1/64 seconds and short time exposure having 1/2000 seconds are performed. The long time exposure time and the short time exposure time can be controlled to be changed.

By performing the long time exposure and the short time exposure, in one field period, a long-time-exposure image signal and a short-time-exposure image signal are obtained. In addition, by combining both image signals, captured image data for one field is generated.

The long time exposure and the short time exposure do not need to be performed in one field period. Instead, processing is possible in which the long time exposure is performed in plural field periods, the short time exposure is performed in the next plural field periods, and the exposure image signals are combined.

Figure 3:
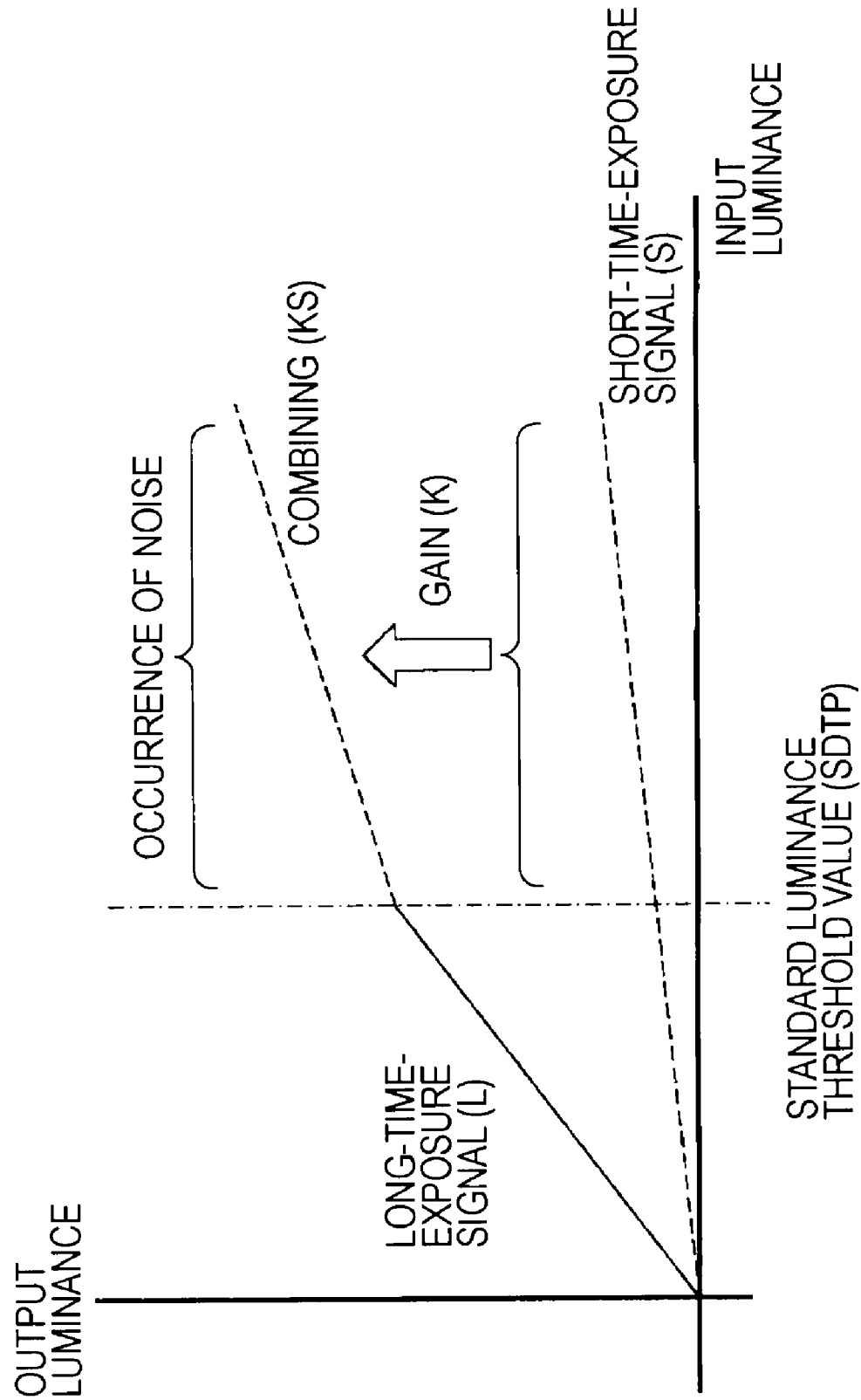
FIG. 3 is a graph illustrating combining processing in the imaging apparatus.

FIG. 3 shows an input/output luminance characteristic L of the long-time-exposure image signal and an input/output luminance characteristic S of the short-time-exposure image signal in order to illustrate combining processing for the long-time-exposure image signal and the short-time-exposure image signal.

In the combining processing, a switching point represented by, for example, a luminance threshold value, is used as a combining position. Each pixel that has a luminance lower than the combining position, that is, the switching point, employs a pixel signal as the long-time-exposure image signal. Each pixel that has a luminance higher than the combining position, that is, the switching point, employs a pixel signal as the short-time-exposure image signal. At this time, by multiplying a short-time-exposure image by an exposure ratio between a long-time-exposure image and a short-time-exposure image, level matching of both images is performed.

If the exposure ratio between the long-time-exposure image and the short-time-exposure image is 10:1, exposure for the short-time-exposure image is 1/10 of that for the long-time-exposure image. However, the amount of existing light is ten times the luminance signal level of the short-time-exposure image. Therefore, by multiplying the short-time-exposure image signal by 10 as gain K, level matching is performed.

As described above, gain multiplication is performed concerning the short-time-exposure image signal, and, as shown in FIG. 3, a characteristic KS whose level matches the long-time-exposure image signal characteristic is obtained.

As a result, a combined image represented by a characteristic L-KS is generated. In other words, regarding the combined image, a relatively dark region of the object provides a portion that is based on the short-time-exposure image signal and that has no underexposure state, and a relatively bright region of the object provides a portion that is based on the short-time-exposure image signal and that has no overexposed highlight.

Regarding a technique of the combined imaging mode for capturing an image of an object having a wide dynamic range in which an output image includes a bright portion to a dark portion, there is not only a technique for combining bright and dark images having different exposure times, as described above, but also various techniques.

For example, there is a technique in which only signals based on the same exposure conditions are extracted from imaging devices while changing sensitivity in units of pixels, images are reproduced, and one or at least two images having different exposure conditions are combined.

In addition, there is also a technique that combines signals output from an imaging device bonded to one that has a light reducing function, such as a neutral density filter in which incident light is divided by a prism and transmitted light is reduced in all wavelengths, that is, the amount of incident light is equally reduced.

According to the combined imaging mode employing these techniques, a dynamic range that is very wider than that in the case of imaging in the normal imaging mode can be obtained. Accordingly, imaging on an object having a wide dynamic range including a very bright portion to a very dark portion in an output image can be performed. For example, the combined imaging mode is adapted for the case of imaging on a room that has strong external light, a place that has a large illumination difference, etc. Specifically, the combined imaging mode is preferable for a case where a dynamic range greatly differs depending on a time zone such as a daytime or nighttime in which imaging is performed in a place such as an entrance to a building such as a bank, or a road.

The pre-processing unit 3 in the imaging apparatus 10 is a so-called an analog front end. The pre-processing unit 3 performs correlated double sampling (CDS), gain processing, and analog-to-digital conversion processing on the electric signal output as a captured image from the imaging element unit 2. The pre-processing unit 3 supplies the signal processing unit 4 with the exposure image signal obtained by the above processing. In other words, in the normal imaging mode, the pre-processing unit 3 supplies the normal exposure image signal to the signal processing unit 4. In the combined imaging mode, the pre-processing unit 3 supplies the long-time-exposure image signal and the short-time-exposure image signal to the signal processing unit 4.

The signal processing unit 4 generates captured image data by performing necessary signal processing for each of the normal imaging mode and the combined imaging mode.

In the normal imaging mode, for example, by performing processing, such as gamma correcting processing and white balance processing, on an input normal exposure image signal, the captured image data is generated.

In addition, in the combined imaging mode, the combining processing described with reference to FIG. 3 is performed on the long-time-exposure image signal and the short-time-exposure image signal, which are input. In other words, the signal processing unit 4 performs timing adjustment and color balance correcting processing on the long-time-exposure image signal and the short-time-exposure image signal, which are time-divisionally supplied, and performs gain processing that causes the luminance level of the short-time-exposure image signal to coincide with that of the long-time-exposure image signal, and combining processing. The signal processing unit 4 generates captured image data by also performing gamma correcting processing and white balance processing on the combined image signal.

The signal processing unit 4 outputs the generated captured image data to the output unit 5 and the detection unit 6.

The output unit 5 performs, on the captured image data from the signal processing unit 4, processing for display on a monitor display, or processing for transmission to an external device.

The detection unit 6 calculates a cumulative luminance value, as photometry processing on the captured image data from the signal processing unit 4, and supplies the cumulative luminance value to the control unit 9. In the detection unit 6, a photometry method to be executed in accordance with an instruction from the control unit 9 is selected. As photometry methods, a center-weighted metering method, an evaluating metering method, an averaging metering method, and a partial exposure metering method can be executed. The photometry methods have different detection frames in an image region. The detection unit 6 supplies the control unit 9 with each detection frame set by each photometry method to be executed.

The control unit 9 is formed by, for example, a microcomputer including a central processing unit (CPU), a read-only memory (ROM), a random access memory (RAM), and a flash memory, and controls operations of the entire imaging apparatus 10.

In addition, the control unit 9 controls the imaging element unit 2, the pre-processing unit 3, the signal processing unit 4, and the timing generator 7, which form an imaging processing system, to execute an imaging operation of each of the normal imaging mode and the combined imaging mode.

In addition, the control unit 9 controls the detection unit 6 to designate a cumulative luminance frame.

Further, the control unit 9 changes a gain to be given to a programmable gain amplifier (PGA) 3a of the pre-processing unit 3 in order to change an operation region in each of the combined imaging mode and the normal imaging mode. Exposure processing is performed by using an optimal gain setting as a reference gain setting.

Figure 4:
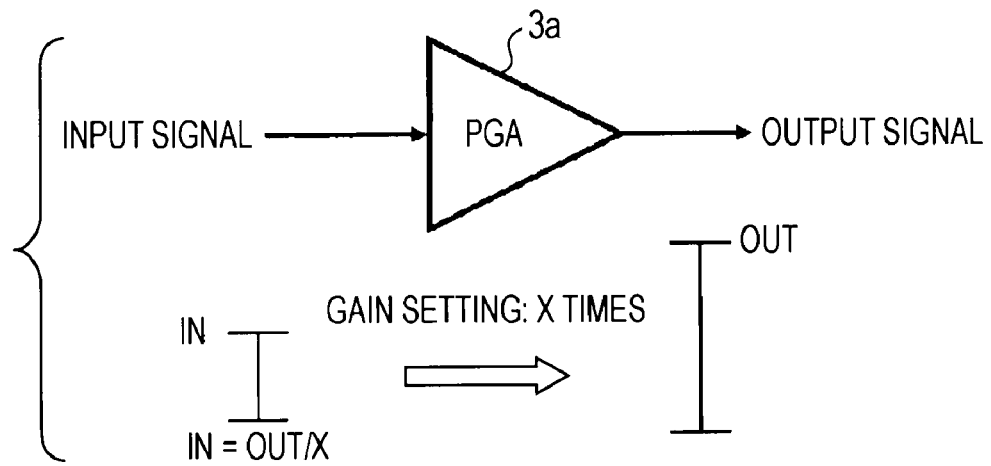
FIG. 4 is an illustration showing a state in which the operation region of an imaging device is changed by changing the gain setting of a PGA in a pre-processing unit.

FIG. 4 shows a state in which the operation region of an imaging device is changed by changing the gain setting of the PGA 3a.

In other words, the operation region of the output signal is fixed. Thus, an input signal region is changed by the gain setting. The maximum of the input signal is represented by $$IN = OUT/X$$

where the maximum of the output signal is OUT, and the gain is X times. Accordingly, the operation region is set.

Here, regarding an example in which an operation point is changed by the reference gain setting in each of the combined imaging mode and the normal imaging mode, a case is discussed in which, when the output of the imaging device is 500 to 600 mV, a variation of the dynamic range of each pixel appears and saturation-caused unevenness is generated.

Figure 5:
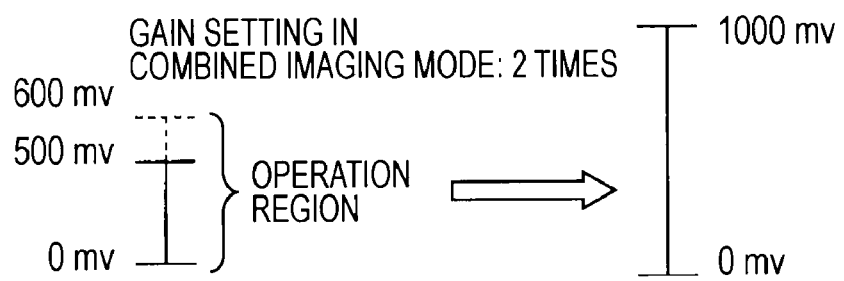
FIG. 5 is an illustration showing a reference gain setting value in a combined imaging mode in the imaging apparatus.

In the combined imaging mode, combining signals including saturation-caused unevenness causes image deterioration. Thus, as shown in FIG. 5, it is necessary to set, as an operation region, a region up to 500 mV at which saturation-caused unevenness is generated. Accordingly, the gain setting is doubled. The reference gain setting value in the combined imaging mode is referred to as WDGAIN.

Figure 6:
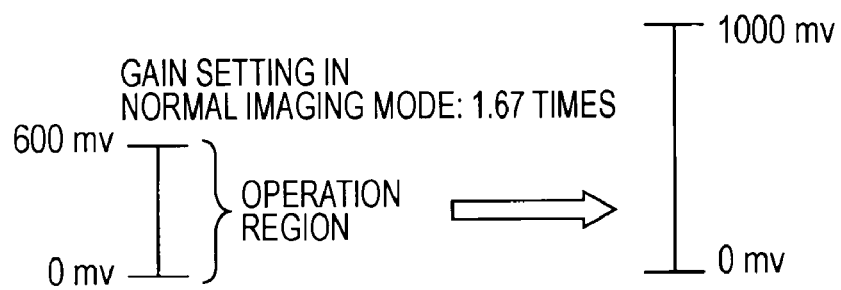
FIG. 6 is an illustration showing a reference gain setting value in a normal imaging mode in the imaging apparatus.

In addition, in the normal imaging mode, it is necessary to extend the operation region as much as possible in order to increase a signal-to-noise ratio. Thus, as shown in FIG. 6, in order to set, as the operation region, a region up to 600 mV to saturation, the gain setting is set to 1.67 times. The reference gain setting value in the normal imaging mode is referred to as NMGAIN.

The reference gain setting value in the combined imaging mode is represented by WDGAIN>NMGAIN. That is, the reference gain setting value WDGAIN in the combined imaging mode is greater than the reference gain setting value NMGAIN in the normal imaging mode.

The ROM in the control unit 9 stores an imaging control program for executing the above control processing. On the basis of the imaging control program, calculating and control processing necessary for the above types of control is executed.

The timing generator 7 generates operation pulses necessary for the imaging element unit 2, such as a CCD. For example, the timing generator 7 generates various types of pulses such as a four-phase pulse for vertical transfer, a field shift pulse, a two-phase pulse for horizontal transfer, and a shutter pulse, and supplies the generated pulses to the imaging element unit 2. The imaging element unit 2 can be driven (electronic shutter function, etc.) by the timing generator 7. When being instructed by the control unit 9 to activate the normal imaging mode, the timing generator 7 allows the imaging element unit 2 to execute normal exposure for a predetermined time in one field period, as shown in FIG. 2A. When being instructed by the control unit 9 to activate the combined imaging mode, the timing generator 7 allows the imaging element unit 2 to execute long time exposure having a relatively long exposure time and short time exposure having a relatively short exposure time.

Obviously, the normal exposure time in the normal imaging mode, and the long and short time exposure times in the combined imaging mode can be changed.

The optical component driving unit 8 is used to drive optical components in the imaging optical system 1. For example, the optical component driving unit 8 includes a driving circuit portion that drives the aperture 1a to adjust the amount of incident light.

The operation unit 11 and the display unit 12 are provided for a user interface. The operation unit 11 outputs operating information to the control unit 9 in response to a user's operation.

In response to an instruction from the control unit 9, the display unit 12 displays information to be displayed, such as an operating state, time information, mode information, and a message.

The operation unit 11 and the display unit 12 may be separated from the imaging apparatus 10. In addition, information to be displayed on the display unit 12 may be displayed on a monitor display for displaying a captured image by superimposing the information, for example, as a character image, on the captured image data in the output unit 5.

Figure 7:
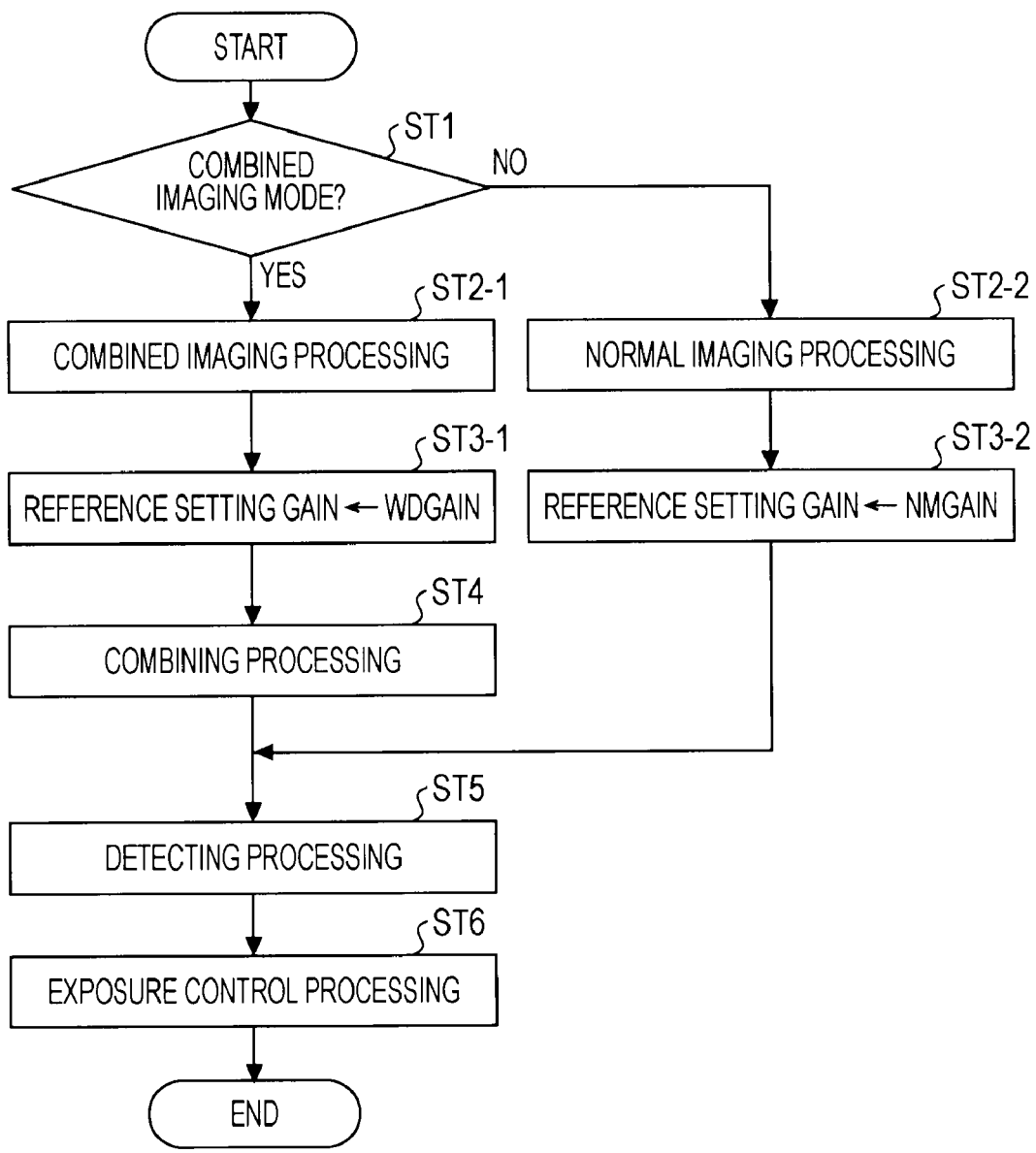
FIG. 7 is a flowchart showing an operation of the imaging apparatus.
Figure 8:
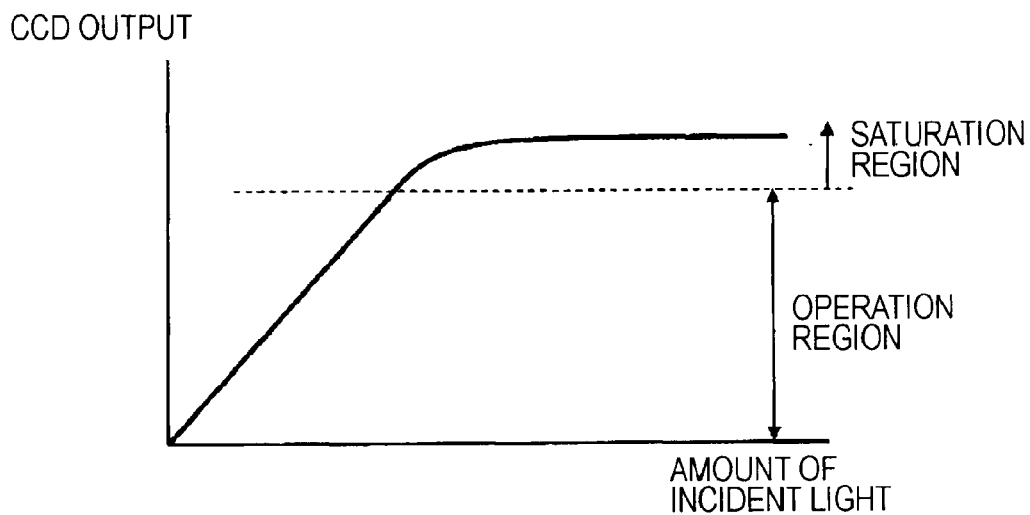
FIG. 8 is a charged-coupled-device photoelectric conversion characteristic chart showing a setting state of an operation region in exposure control of a wide dynamic range camera of the related art.
Figure 9:
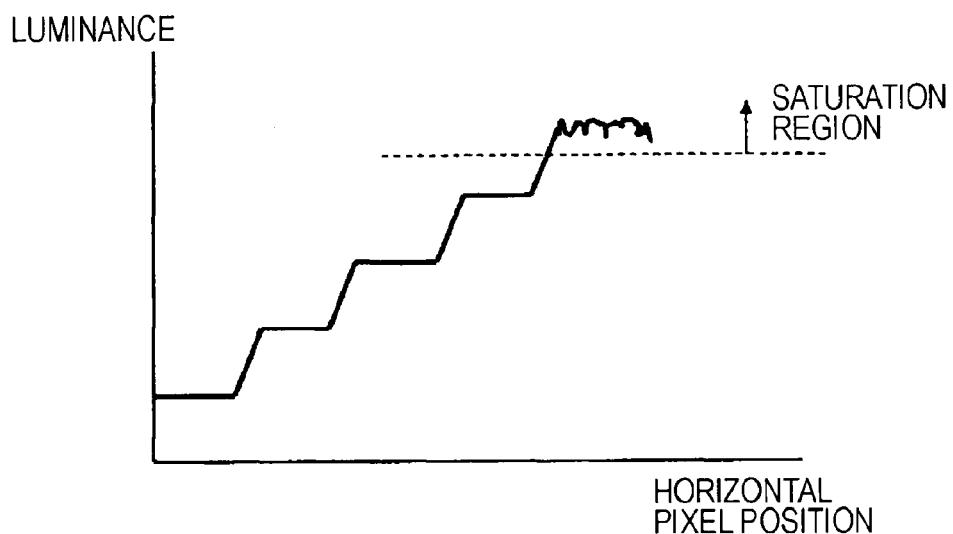
FIG. 9 is a waveform chart showing a luminance signal of an image obtained by a wide dynamic range camera of the related art.

In the imaging apparatus 10 having the above-described configuration, on the basis of control of the control unit 9, an imaging operation is performed in accordance with the flowchart shown in FIG. 7.

After the imaging apparatus 10 starts the imaging operation, in step ST1, the control unit 9 performs operating mode determination that determines whether or not the combined imaging mode is activated. If the control unit 9 has affirmatively determined, that is, if the combined imaging mode is activated, the control unit 9 proceeds to step ST2-1 and performs combined imaging processing. Alternatively, if the control unit 9 has negatively determined, that is, if the normal imaging mode is activated, the control unit 9 proceeds to step ST2-2 and performs the normal imaging processing.

In the combined imaging processing in step ST2-1, the control unit 9 uses the timing generator 7 to control driving of the imaging element unit 2 and to set one electronic shutter speed in the imaging element unit 2, and executes the long time exposure and short time exposure as shown in FIG. 2B. In other words, the timing generator 7 can set two different electronic shutter speeds in one field period, and allows the imaging element unit 2 to execute the long time exposure and short time exposure as shown in FIG. 2B in one field period. This makes it possible to obtain two captured image signals based on different amounts of exposure, for example, a long-time-exposure image signal corresponding to an exposure time of 1/64 seconds and a short-time-exposure image signal corresponding to an exposure time of 1/2000 seconds. The long-time-exposure image signal and the short-time-exposure image signal are processed by the pre-processing unit 3, and the processed signals are supplied to the signal processing unit 4.

In step ST3-1, the control unit 9 uses the reference gain setting value set in the PGA as the reference gain setting value WDGAIN in the combined imaging mode, whereby an operation point is lowered from the saturation region, so that saturation-caused unevenness is prevented from being generated.

In step ST4, the control unit 9 controls the signal processing unit 4 to perform combining processing in the technique described with reference to FIG. 3.

In other words, in the combined imaging mode, the signal processing unit 4 combines the long-time-exposure image signal and the short-time-exposure image signal, which are digitized by the pre-processing unit 3, to extend the dynamic range, and outputs the combined signal to the output unit 5 and the detection unit 6.

In addition, in the normal imaging processing in step ST2-2, the timing generator 7 controls driving of the imaging element unit 2 and sets one electronic shutter speed in the imaging element unit 2. The timing generator 7 controls the imaging element unit 2 to execute normal exposure for a predetermined time in one field period, and to generate a normal exposure image signal. The normal exposure image signal is processed by the pre-processing unit 3, and the processed signal is supplied to the signal processing unit 4. In the normal imaging mode, the signal processing unit 4 does not perform combining, and outputs the normal exposure image signal to the output unit 5 and the detection unit 6.

In step ST5, the detection unit 6 performs detecting processing.

In the detecting processing in step ST5, the detection unit 6 generates a cumulative luminance value in a detection frame designated by the control unit 9, and transmits the cumulative luminance value to the control unit 9 for each field.

In step ST6, the control unit 9 performs exposure control processing.

In the exposure control processing in step ST6, the control unit 9 uses the cumulative luminance value received from the detection unit 6 to calculate, from the difference between the present luminance and a target luminance, control values necessary for the aperture value of the aperture 1a, the long time exposure time and short time exposure time of the imaging element unit 2, and the PGA of the pre-processing unit 3, whereby appropriate exposure control is performed. In other words, the lower the luminance of the object is, the more the gain that is set in the PGA is increased. The higher the luminance of the object is, the more the gain that is set in the PGA is decreased. Further, as the luminance of the object is higher, luminance adjustment is performed by controlling the aperture 1a to be closed.

In other words, in the imaging apparatus 10, the exposure image signal obtained by the imaging element unit 2 that can selectively execute an imaging operation in the normal imaging mode and an imaging operation in the combined imaging mode, or the long-time-exposure image signal and short-time-exposure image signal are amplified by the pre-processing unit 3 and the amplified signals are supplied to the signal processing unit 4. The signal processing unit 4 generates an image signal by performing signal processing on the exposure image signal obtained in the imaging operation in the normal imaging mode, and combines the long-time-exposure image signal and short-time-exposure image signal obtained in the imaging operation in the combined imaging mode by the imaging element unit 2, whereby a combined image signal having a dynamic range relatively wider than that of at least one of the long-time-exposure image signal and the short-time-exposure image signal is generated. In this case, the control unit 9 switches the reference gain setting value in the pre-processing unit 3 in accordance with the imaging mode in the imaging element unit 2, whereby, when the imaging element unit 2 is in an image operation state of the combined imaging mode, control is performed so that the reference gain setting value is greater than the reference gain setting value when the imaging element unit 2 is in an imaging operation state of the normal imaging mode is set.

As described above, in the imaging apparatus 10, by switching an operation region of the imaging device in each of the combined imaging mode and the normal imaging mode, in the normal imaging mode, the operation point is extended to the saturation region to increase the signal-to-noise ratio. In the combined imaging mode, the operation point is set to be lower than the saturation region, whereby saturation-based unevenness is prevented, so that optimal image quality for both imaging modes can be obtained.

In the imaging apparatus 10, the imaging control program according to the present invention is the above-described processing program in the control unit 9, that is, a program that causes the control unit 9 formed by the microcomputer to execute the steps shown in FIG. 7.

This program can be recorded beforehand in a hard disk drive (as a recording medium) built into a device such as the imaging apparatus 10, a read-only memory, a flash memory, or the like, in the microcomputer including a CPU.

Alternatively, the program can be temporarily or permanently stored (recorded) in a removable recording medium such as a compact-disc read-only memory, a magneto-optical disc, a digital versatile disc, a Blu-ray disc, a magnetic disk, a semiconductor memory, or a memory card. This removable recording medium can be provided as so-called package software.

The imaging control program can be installed from a removable recording medium to a personal computer or the like. In addition, the imaging control program can be downloaded from a download site via a network such as a local area network or the Internet.

The embodiment has been described. However, the present invention may be variously modified.

Although the present invention can be applied to, for example, a camera system that performs moving image imaging, it can be also applied to a camera system that performs still image imaging. Even if still image imaging is performed in the set exposure mode, during monitoring up to, for example, imaging timing, in each field period, the above-described exposure control (control of short time exposure time) may be performed.

In addition, in a case where noninterlaced scanning imaging is performed, the above-described processing in the field period may be considered as processing in the frame period.

Needless to say, the unit period of an image signal can be variously considered, such as a field period, a frame period, plural field periods, and plural frame periods, regardless of the scanning method. For example, an operation example is possible in which the detecting processing, exposure correcting processing, and the exposure control processing are performed in, for example, once in plural frame periods.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging apparatus comprising:
   an imaging unit capable of selectively executing an imaging operation in a normal imaging mode that outputs a normal exposure image signal as one exposure image signal in a unit period and an imaging operation in a combined imaging mode that outputs, in the unit period, a long-time-exposure image signal corresponding to a relatively long exposure time and a short-time-exposure image signal corresponding to a relatively short exposure time;
   a pre-processing unit that performs gain processing on the normal exposure image signal, or the long-time-exposure image signal and the short-time-exposure image signal, wherein the pre-processing unit includes a programmable gain amplifier;
   a signal processing unit that, by combining the long-time-exposure image signal and short-time-exposure image signal subjected to the gain processing, generates a combined image signal having a dynamic range relatively wider than at least one of dynamic ranges of the long-time-exposure image signal and the short-time-exposure image signal; and
   a control unit that performs control in which, by switching a reference gain setting value for the programmable gain amplifier in the gain processing in the pre-processing unit in accordance with one of the normal imaging mode and the combined imaging mode, when the imaging unit is in the combined imaging mode, the reference gain setting value is set to be greater than the reference gain setting value set when the imaging unit is in the normal imaging mode.

2. The imaging apparatus according to claim 1, further comprising a detection unit that performs detection in response to an output of the signal processing unit,
   wherein the control unit performs exposure control in response to an output of the detection unit.

3. An imaging method comprising the steps of:
   performing imaging in one of an imaging operation in a normal imaging mode that outputs a normal exposure image signal as one exposure image signal in a unit period, and an imaging operation in a combined imaging mode that outputs, in the unit period, a long-time-exposure image signal corresponding to a relatively long exposure time and a short-time-exposure image signal corresponding to a relatively short exposure time;
   performing gain processing on the normal exposure image signal, or the long-time-exposure image signal and the short-time-exposure image signal;
   by combining the long-time-exposure image signal and short-time-exposure image signal subjected to the gain processing, generating a combined image signal having a dynamic range relatively wider than at least one of dynamic ranges of the long-time-exposure image signal and the short-time-exposure image signal; and
   by switching a reference gain setting value for a programmable gain amplifier in the gain processing in accordance with one of the normal imaging mode and the combined imaging mode, in the case of the combined imaging mode, setting the reference gain setting value to be greater than the reference gain setting value in the normal imaging mode.

4. A non-transitory computer-readable medium including a program, which when executed by a computer, causes the computer to execute an imaging method comprising the steps of:
   performing imaging in one of an imaging operation in a normal imaging mode that outputs a normal exposure image signal as one exposure image signal in a unit period, and an imaging operation in a combined imaging mode that outputs, in the unit period, a long-time-exposure image signal corresponding to a relatively long exposure time and a short-time-exposure image signal corresponding to a relatively short exposure time;

performing gain processing on the normal exposure image signal, or the long-time-exposure image signal and the short-time-exposure image signal;

by combining the long-time-exposure image signal and short-time-exposure image signal subjected to the gain processing, generating a combined image signal having a dynamic range relatively wider than at least one of dynamic ranges of the long-time-exposure image signal and the short-time-exposure image signal; and by switching a reference gain setting value for a programmable gain amplifier in the gain processing in accordance with one of the normal imaging mode and the combined imaging mode, in the case of the combined imaging mode, setting the reference gain setting value to be greater than the reference gain setting value in the case of the normal imaging mode.

\* \* \* \* \*